US009092366B2

(12) United States Patent
King et al.

(10) Patent No.: US 9,092,366 B2
(45) Date of Patent: Jul. 28, 2015

(54) SPLITTING DIRECT MEMORY ACCESS WINDOWS

(71) Applicant: International Business Machines Corporation, Armonk, NY (US)

(72) Inventors: Justin K. King, Rochester, MN (US); John R. Oberly, III, Rochester, MN (US); Travis J. Pizel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 14/057,748

(22) Filed: Oct. 18, 2013

(65) Prior Publication Data

US 2015/0058597 A1   Feb. 26, 2015

Related U.S. Application Data

(63) Continuation of application No. 13/973,655, filed on Aug. 22, 2013.

(51) Int. Cl.
 *G06F 13/12* (2006.01)
 *G06F 13/38* (2006.01)
 *G06F 12/10* (2006.01)

(52) U.S. Cl.
 CPC .................. *G06F 12/1081* (2013.01)

(58) Field of Classification Search
 None
 See application file for complete search history.

(56) References Cited

U.S. PATENT DOCUMENTS

| | | | |
|---|---|---|---|
| 6,061,773 A | 5/2000 | Harvey et al. | |
| 6,308,247 B1 | 10/2001 | Ackerman et al. | |
| 6,629,162 B1 * | 9/2003 | Arndt et al. | 710/28 |
| 7,783,858 B2 | 8/2010 | Chiang et al. | |
| 8,082,400 B1 | 12/2011 | Chang et al. | |
| 8,286,177 B2 | 10/2012 | Hollingsworth | |
| 8,312,230 B2 | 11/2012 | Jacobs et al. | |
| 8,327,085 B2 | 12/2012 | Anand et al. | |
| 8,327,370 B2 | 12/2012 | Atyam et al. | |
| 8,413,143 B2 | 4/2013 | Cardona et al. | |
| 8,806,098 B1 * | 8/2014 | Mandapuram et al. | 710/104 |
| 2006/0212870 A1 | 9/2006 | Arndt et al. | |
| 2012/0151471 A1 * | 6/2012 | Brownlow et al. | 718/1 |
| 2013/0055277 A1 | 2/2013 | Ashish et al. | |
| 2013/0091321 A1 * | 4/2013 | Nishtala et al. | 711/103 |
| 2013/0198439 A1 * | 8/2013 | Kurotsuchi et al. | 711/103 |
| 2014/0281056 A1 * | 9/2014 | Davda et al. | 710/26 |

OTHER PUBLICATIONS

U.S. Appl. No. 13/973,655, entitled Splitting Direct Memory Access Windows, filed Aug. 22, 2013.

* cited by examiner

*Primary Examiner* — Elias Mamo
(74) *Attorney, Agent, or Firm* — Patterson & Sheridan, LLP

(57) ABSTRACT

A computing device may split a translation table used when performing a DMA operation into two different translation tables. To split the translation table, the computing device may update the registers in the IOMMU to include pointers to the two different translation tables. For example, the IOMMU may update one register to point to the same starting address as the original translation table but assign a shorter length (i.e., fewer entries) to that table. The extra entries may then be used to form the other translation table by adding a new pointer to one of the IOMMU registers. The two translation tables may be owned by the same service provider or two different service providers. Alternatively, the computing device may assign the two tables to the same service provider which in turn assigns the tables to respective client devices executed by the service provider.

6 Claims, 7 Drawing Sheets

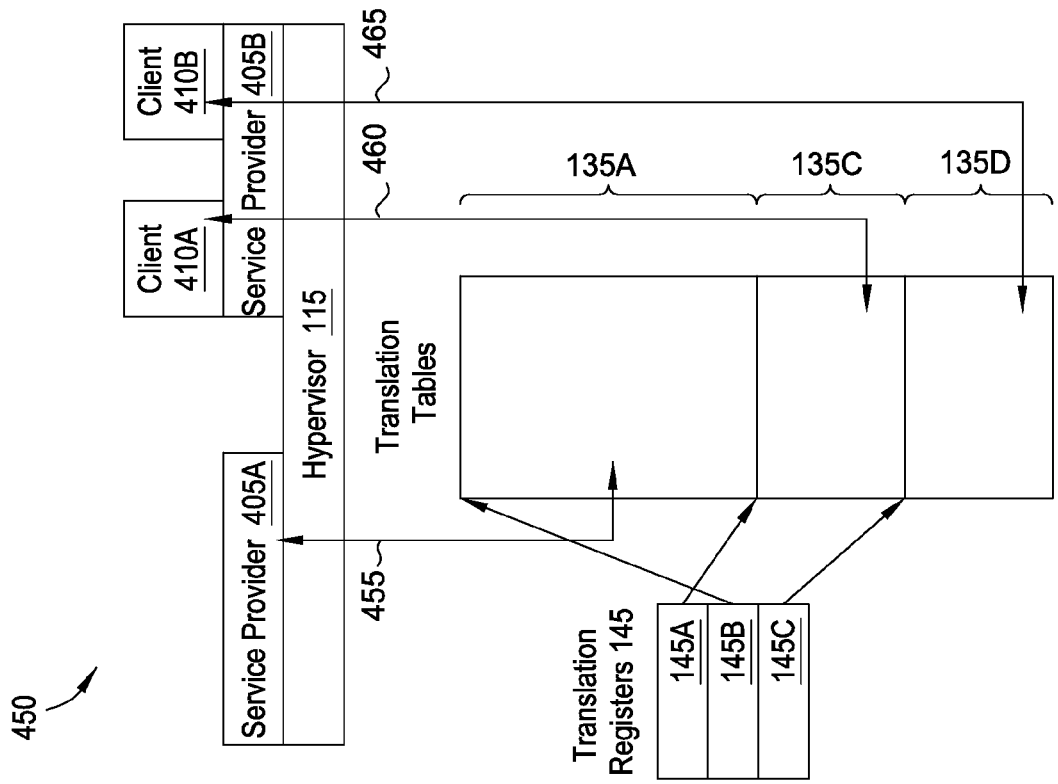
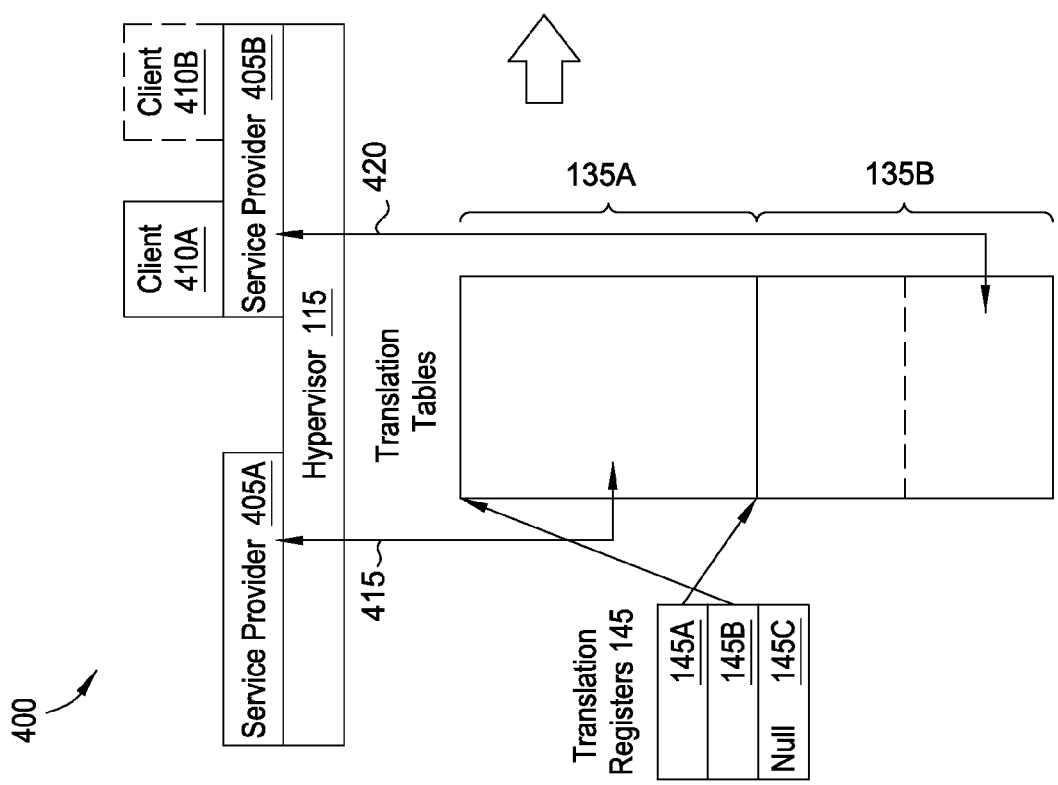
FIG. 4B
FIG. 4A

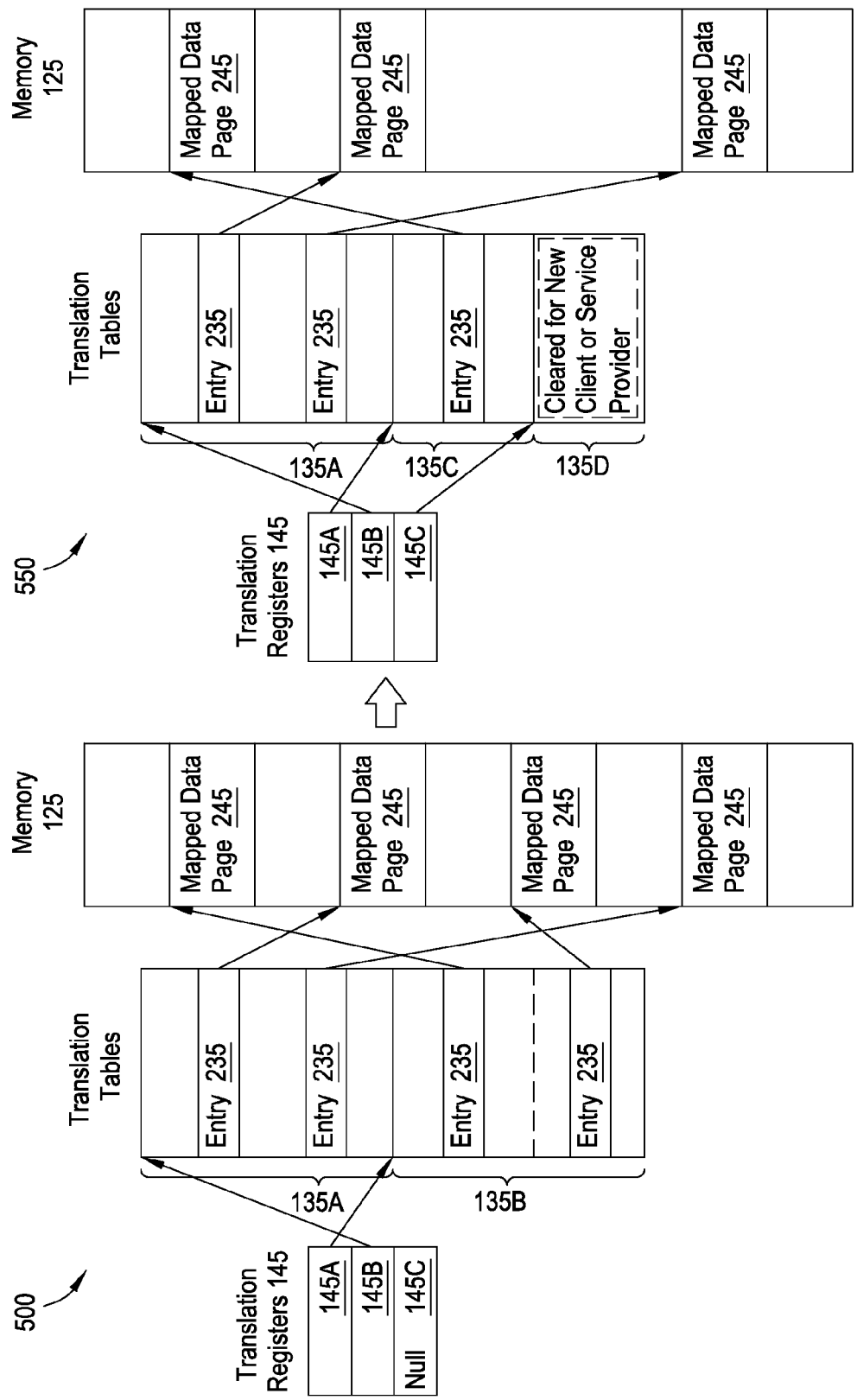

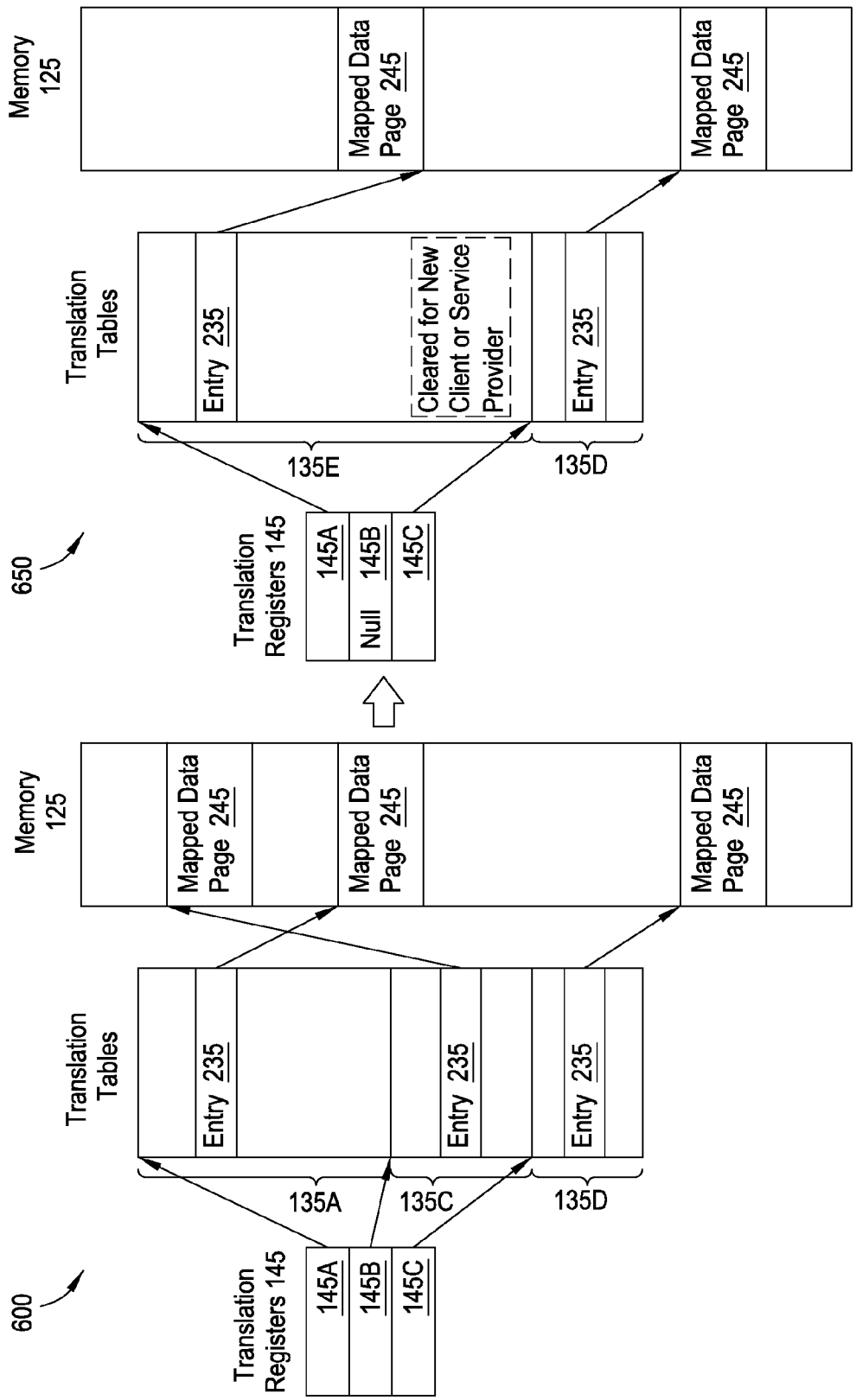

SPLITTING DIRECT MEMORY ACCESS WINDOWS

CROSS-REFERENCE TO RELATED APPLICATIONS

This application is a continuation of co-pending U.S. patent application Ser. No. 13/973,655, filed Aug. 22, 2013. The aforementioned related patent application is herein incorporated by reference in its entirety.

BACKGROUND

Computing systems often include I/O adapters that are configured to communicate over a network or connect to periphery devices that enhance the capability of the computing system, such as providing additional storage. If the I/O adapter is coupled to an Ethernet network, for example, packets of data are sent from computer to computer according to one or more communication protocols, such as Transmission Control Protocol (TCP) and Internet Protocol (IP). Each computer in the network, for example, may include an I/O Ethernet adapter configured to facilitate communications between an operating system (OS) running on each of the respective computing systems. The operating systems may include a device driver configured to interact with the I/O adapter of the respective computer.

SUMMARY

Embodiments of the present disclosure include a method and a computer program product. The method and program product determine to split a direct memory access (DMA) translation table assigned to a first service provider in a computing system into a first translation table and a second translation table where the first and second translation tables perform a virtual address to physical address translation for accessing data stored in respective DMA windows. The DMA windows define respective portions of memory in the computing system. The method and program product update a first register of a plurality of registers to include a pointer to the first translation table and store in a second register of the plurality of registers a pointer to the second translation table. The method and program product assign the second translation table to a second service provider in the computing system or a client executed by the first service provider. The second service provider or the client use the second translation table to perform a DMA operation between an I/O adapter and one of the DMA windows in the memory of the computer system.

Another embodiment of the present disclosure includes a computer system. The computer system includes a hypervisor configured to determine when to split a DMA translation table assigned to a first service provider in the computing system into a first translation table and a second translation table where the first and second translation tables perform a virtual address to physical address translation for accessing data stored in respective DMA windows. The DMA windows define respective portions of memory in the computing system. The computer system also includes an I/O adapter and an I/O memory management unit configured to update a first register of a plurality of registers to include a pointer to the first translation table and store in a second register of the plurality of registers a pointer to the second translation table. Furthermore, the second translation table is assigned to a second service provider in the computing system or a client executed by the first service provider. The second service provider or the client use the second translation table to perform a DMA operation between the I/O adapter in the computer system and one of the DMA windows in the memory of the computer system.

BRIEF DESCRIPTION OF THE SEVERAL VIEWS OF THE DRAWINGS

FIGS. 4A-4B illustrate splitting a translation table, according to embodiments described herein.

FIGS. 5A-5B illustrate modifying translation registers and tables when splitting a translation table, according to embodiments described herein.

FIGS. 6A-6B illustrate modifying translation registers and tables when merging two translation tables, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
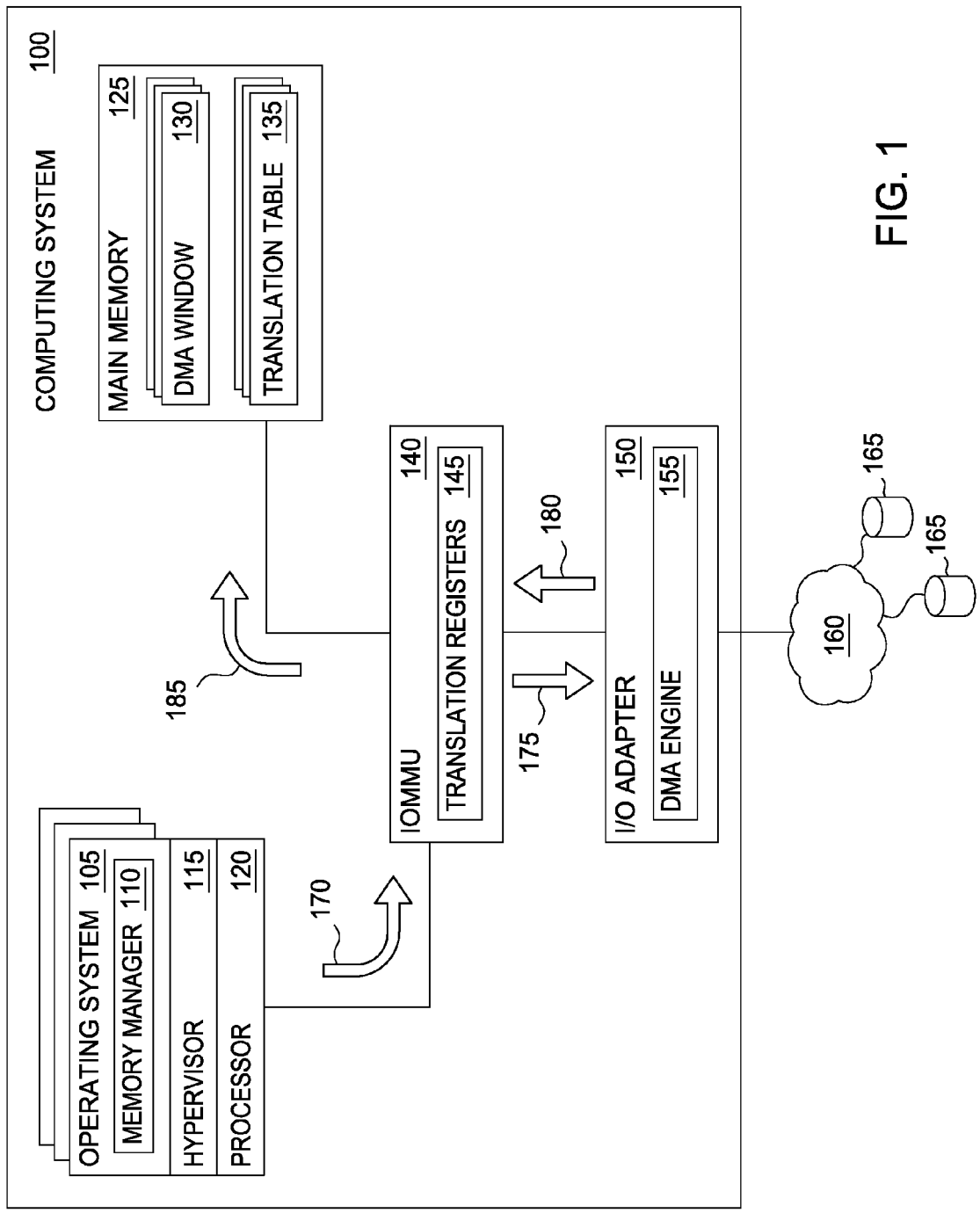
FIG. 1 illustrates a computing system for performing a direct memory access operation, according to one embodiment described herein.

Embodiments described herein manage address translation tables by merging or splitting the tables in order to change the size of corresponding direct-memory access (DMA) windows. As used herein, a DMA window is a portion of memory (which may include contiguous or discontiguous chunks of memory) in a computing device that is mapped by entries within a translation table—e.g., each entry in the translation table may map to one of the chunks of the DMA window. Each DMA window and its corresponding translation table may be assigned to a specific service provider in the computing system such as a virtual machine, operating system, an I/O adapter, and the like. During a DMA read or write, the translation table converts a virtual address used by the I/O adapter to a physical address of memory in the DMA window. To do so, the translation table may include a plurality of different entries that map to separate chunks or data pages in the DMA window. Changing the size of the translation table (i.e., the number of entries containing in the table) also alters the number of data pages in the DMA window that can be mapped to the translation table.

In one embodiment, the computing device may split a translation table into two different translation tables. The two translation tables may be owned by the same service provider or one of the tables may be assigned to a different service provider. For example, a service provider may be servicing two different clients (e.g., applications). Instead of the clients sharing the same DMA window that is associated with the service provider, the computing device may split the translation table and assign the one of the translation tables to each of the clients. In this manner, each client is assigned an individual DMA window in memory that is protected from the other client. Alternatively, the service provide may not be efficiently utilizing its DMA window. Thus, to more efficiently use the system memory, the provider's translation table may be split where one of the new translation tables is assigned to a different service provider that may benefit (e.g., experience increased performance) from the addition of the new translation table and its associated DMA window.

In another embodiment, two or more translation tables may be merged into a signal translation table. For example, if a service provider owns two translation tables that are assigned to respective clients, if one of the clients is no longer executing, the computing device may merge the translation tables into a single translation table and DMA window. When splitting or merging translation tables, in one embodiment, the computing device may clear the entries in the translation table before the translation table is reassigned to a new service provider or client.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a computing system 100 for performing a DMA operation, according to one embodiment described herein. The computing system 100 includes an operating system (OS) 105, processor 120, main memory 125, input/output memory management unit (IOMMU) 140, and input/output (I/O) adapter 150. In one embodiment, the computing system 100 uses the I/O adapter 150 to transfer data to, and receive data from, a network 160 that includes one or more external storage elements or I/O devices 165. Specifically, the computing system 100 may use the different hardware, firmware, or software components shown in FIG. 1 to perform DMA operations between the I/O adapter 150 and the main memory 125.

A DMA operation is a feature the permits the computing system 100 to access memory independently of the processor 120 (e.g., a central processing unit that may include multiple cores or multiple processing elements). Without DMA, when the processor 120 uses programmed input/output, the processor 120 may be occupied for the entire duration of the read or write operation, and thus, is unavailable to perform other tasks. With DMA, the processor 120 initiates the transfer, may perform other tasks, and receives an interrupt or notification from a DMA controller—e.g., IOMMU 140—when the DMA operation is complete.

Arrow 170 illustrates that the processor 120 transmits an instruction to the IOMMU to perform a DMA operation. For example, the processor 120 may initiate the DMA in response to a cache miss or a data request from a service provide (e.g., OS 105 or I/O adapter 150). The IOMMU 140 instructs the I/O adapter 150 (as shown by arrow 175) to retrieve one or more chunks of data (e.g., data pages) from a connected device. As shown in FIG. 1, the I/O adapter 150 (e.g., a network card) is coupled to a network 160 which communicatively couples the adapter 150 to the I/O devices 165 or data repositories. However, in other embodiments, the I/O adapter 150 may be a disk drive controller, graphics card, sound card or other adapter that permits a connection to a periphery device—e.g., Fibre Channel or InfiniBand® connections (InfiniBand is a registered trademark of the InfiniBand Trade Association). In these embodiments, the network 160 may be omitted.

If the DMA access is a write operation, a DMA engine 155, which may be firmware, hardware, or some mixture of both, transmits the DMA request to the I/O devices 165 using, for example, an Ethernet network 160. The I/O devices 165 then return the requested data chunks to the DMA engine 155. As shown by arrow 180, the DMA engine 155 transfers the retrieved data chunks to the IOMMU 140 which maps the device-specific virtual address (also called I/O bus addresses) associated with the data chunks to physical memory address of the computer system 100. In one embodiment, the IOMMU 140 uses the registers 145 which store pointers to the translation tables 135 to select which tables 135 is used when performing the memory address translation. I/O adapter 150, DMA Engine 155, and the IOMMU 140 retrieve and store data in the I/O devices 165 using virtual addresses to avoid having to allocate a large portion of contiguous physical memory of the main memory 125 to the I/O devices 165. Instead, the IOMMU 140 uses the translation table 135 to map these contiguous virtual addresses to physical addresses (i.e., different chunks of a DMA window 130) that may be fragmented—e.g., located in different memory modules in main memory 125. Moreover, using the translation registers 145 and tables 135 allow the memory 125 to be divided into DMA windows 130 that are assigned to specific service providers (e.g., a virtual machine, OS 105, I/O adapter 150, and the like) which may prevent a service provider from corrupting data associated with other service providers.

Once the IOMMU 140 identifies the physical addresses corresponding to the retrieved data, as shown by arrow 185, the IOMMU 140 transfers the data to the memory 125 which stores the retrieve data as, for example, data pages in the corresponding DMA window 130. The processor 120 may then retrieve these data pages using the IOMMU 140 or a different communication path not shown in computing system 100. The processor 120 may initiate a DMA read in a similar manner except that the IOMMU 140 retrieves data from the main memory 125, uses the translation registers 145 and table 135 to map the physical addresses to device-specific virtual addresses, and transmits the data to the I/O adapter 150 and DMA engine 155 which store the data in a connected device.

The computing system 100 also includes a hypervisor 115 which permits multiple operating systems to run concurrently on the system 100 in multiple virtual machines. Specifically, the hypervisor 115 enables the different operating systems to access and share the hardware resources of the computing system 100. Of course, the hypervisor 115 may be optional if, for example, the computing system 100 does not use multiple operating systems 105.

In one embodiment, the main memory 125 may be any memory that is external to the processor 120 in the computing system 100—i.e., is not built into the integrated circuit of the processor 120. For example, the main memory 125 may include one or more levels of cache memory as well as random access memory but may, in one embodiment, exclude memory coupled to I/O adapters 150 such as external storage networks or disk drives.

Figure 2:
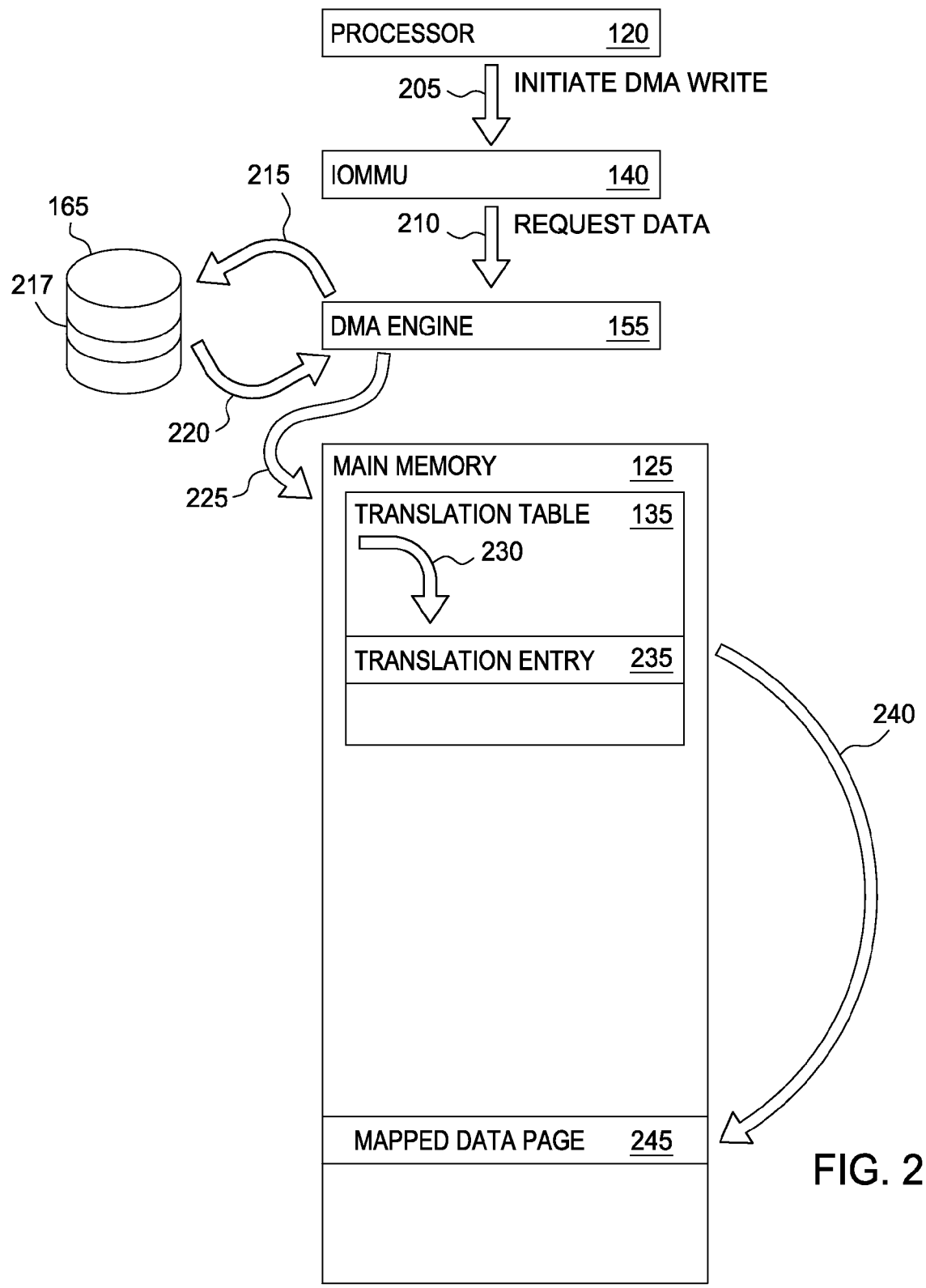
FIG. 2 is a flow diagram for performing a direct memory access write operation, according to one embodiment described herein.

FIG. 2 is a flow diagram for performing a DMA write operation, according to one embodiment described herein. As shown by arrow 205, the processor 120 initiates a DMA write operation by transmitting one or more instructions to the IOMMU 140. In one embodiment, the processor 120 provides a specific I/O port or bus number (e.g., a virtual address) to use for the DMA operation, the direction of the I/O transfer (a read or write), and the number of bytes to transfer from the I/O device. The IOMMU 140 forwards the data request to the DMA engine 155 as shown by arrow 210. In one embodiment, the IOMMU 140 is a hardware element fabricated within the processor 120; however, in other embodiments the IOMMU 140 may either be a separate hardware element or firmware operating on a hardware component in the computing system other than processor 120.

In one embodiment, the computing system may have a plurality of I/O adapters that each has a DMA engine 155. Accordingly, the IOMMU 140 may determine which DMA engine should receive the request based on the I/O port specified by the processor 120. The DMA engine 155 sends a request 215 to a coupled I/O device 165 using any one of a number of communication protocols or standards—e.g., Ethernet, Fibre Channel, Infiniband, etc. The I/O device 165 responds by transmitting the requested data 217 back to the DMA engine 155 as shown by arrow 220. The DMA engine 155 or the IOMMU 140 may increment a byte count until it has retrieved all the bytes specified by the instructions received from the processor 120.

Arrow 225 represents forwarding the retrieved data from the DMA engine 155 to the IOMMU 140 either one data word at a time or in a burst mode using, for example, a PCI of PCIe type connection. As shown by arrow 230, the IOMMU 140 may use the translation registers (not shown) and the translation table 135 to translate the virtual address associated with the retrieved data (e.g., an I/O bus address) to a physical address in memory 125. The translation table 135 includes a plurality of translation entries 235 that map one or more virtual addresses associated with the retrieved data to a physical memory addresses in a computing system. In one embodiment, each entry 235 in the translation table 135 may map to a specific mapped data page 245 in memory 125. For example, an entry 235 may be an eight byte data structure that points to a four kilobyte data page 245 in main memory. Thus, if the retrieved data has a virtual address matching an entry 235, the physical address indicated in the entry 235 is used to store the retrieved data in memory 125. Of course, a plurality of virtual addresses may be associated with data retrieved from the data repository 165, and thus, the IOMMU 140 may use a plurality of translation entries 235 for translating the virtual addresses into physical addresses to complete the DMA operation.

After identifying the correct physical address as shown by arrow 230, the IOMMU 140 forwards the retrieved data to the main memory 125 which may store the data as one or more mapped data pages 245 based on the physical address in the DMA window. After completing the DMA operation, the IOMMU 140 may transmit a notification to the processor to indicate that the requested data is now stored in memory 125. The processor 120 may then retrieve the data page 245 from the main memory 125 in response to, for example, a request from a service provider.

Figure 3:
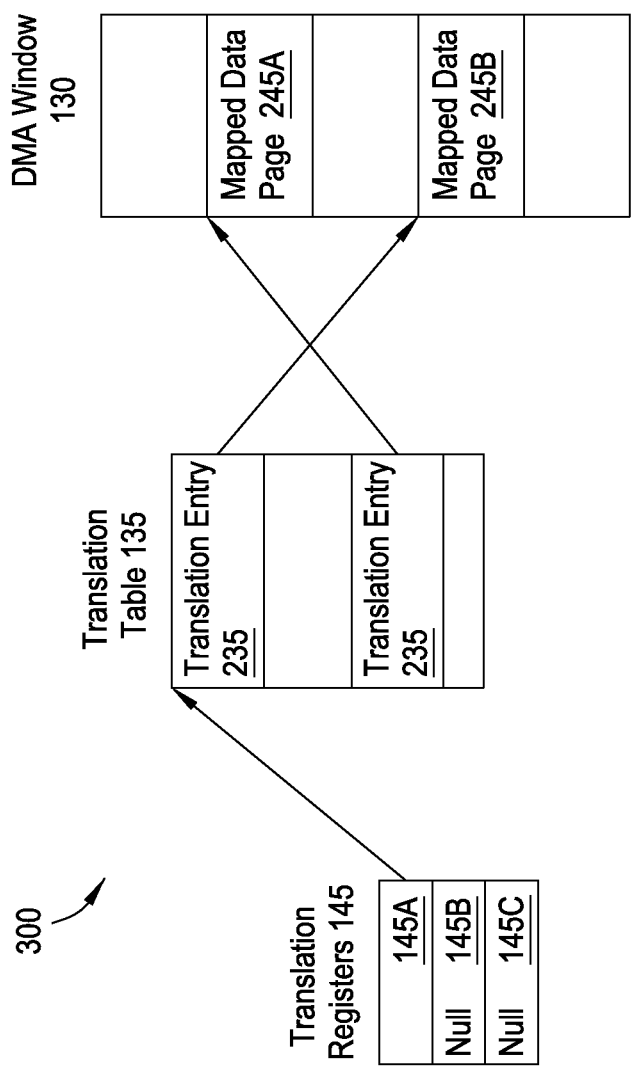
FIG. 3 illustrates a system for using a translation register and table to access a DMA window, according to one embodiment described herein.

FIG. 3 illustrates a system 300 for using a translation register 145 and table 135 to access a DMA window 130, according to one embodiment described herein. For example, system 300 may illustrate the state of a computing device upon boot up where all of the memory is assigned to one service provider. The translation registers 145 may include a plurality of registers 145A-C that may store a data structure that points to a translation table 135. Here, because there is only one translation table 135, only register 145A has a non-null value. In one embodiment, the data structure in register 145A may point to the beginning address of the translation table 135 as well as indicate the size or length of the translation table 135 (e.g., the number of entries in the table 135 or the last address of the table 135). As shown in FIGS. 1 and 2, the translation table 135 may be a stored in the main memory 125 but this is not a requirement. In other embodiments, the translation tables 135 may be stored in the IOMMU or in specialized memory element (e.g., a ternary content-addressable memory). As will be discussed later, registers 145B and 145C provide memory storage elements for adding new translation tables 135 to the system 300. Although the present disclosure describes using the registers 145 to point to respective translation tables, it is equally accurate to state that there is only one translation table in the computing system that may be sub-divided into different portions where each register 145 points to one of the translation table portions.

Translation table 135 includes one or more entries 235 that point to mapped data pages 245A and 245B in the DMA window 130 associated with the table 135. In one embodiment, the total number of possible entries 235 in the translation table defines the maximum size of the DMA window 130. If portions of the DMA window 130 are unused, then there may not be a corresponding entry in the translation table 135. However, assuming that that the DMA window 130 is full (i.e., stores the maximum number of data pages 245), in one embodiment, the translation table 135 contains the maximum number of entries 235 where each entry 235 points to one of the mapped data pages 245 in the window 130. However, in other embodiments, it may be desirable to have additional space in the DMA window 130 or the translation table 135 such that the number of entries 235 and mapped data pages 245 is not one-to-one—e.g., the DMA window 130 may contain additional memory that is not mapped by an entry 235 in table 135.

As shown in FIG. 3, the entries 245 and mapped data pages 245 do not need to be stored sequentially in the table 135 or window 130. That is, there may be empty (or null) memory locations between valid translation entries 235 and data pages 245 that are currently unused. For example, at initialization, all the memory in tables 135 and DMA window 130 may be unused. However, as data is read from, or written to, the DMA window 130 during DMA read and writes, the system 300 may begin to generate that entries 235 and corresponding mapped data pages 245.

Splitting a Translation Table

FIGS. 4A-4B illustrate splitting a translation table, according to embodiments described herein. Specifically, system 400 of FIG. 4A illustrates a state before splitting translation table 135A. As shown, system 400 includes two translation tables where translation table 135A is assigned to service provider 405A while translation table 135B is assigned to service provider 405B. In one embodiment, the data paths 415 and 420 illustrate that service provider 405A may only access translation table 135A in order to store, retrieve, or change data in its accompanying DMA window (not shown) and only service provider 405B may access translation table 135B. The IOMMU may be tasked with ensuring that only the service provider 405 assigned to the translation table 135 is permitted to read and write to the physical memory (e.g., the DMA window) mapped by the entries in the table 135.

As discussed above, service provider 405A may be an I/O adapter that retrieves and stores data in external data repositories. In one embodiment, the I/O adapter may be a PCIe device that is virtualized using the single root I/O virtualization protocol to generate a SR-IOV physical function (SR-IOV PF) which is used to a configure and manage one or more SR-IOV virtual functions (SR-IOV-VF). In this example, the SR-IOV PF may be a service provider 405A while the SR-IOV VFs are (virtualized) instances of the PCIe device. Generally, SR-IOV PFs are full-featured PCIe functions that can be discovered, managed, and manipulated like any other PCIe device. Furthermore, the SR-IOV PFs may have full configuration resources, meaning that the SR-IOV PF can configure or control the coupled PCIe device and move data in and out of the PCIe device. The SR-IOV VFs, in contrast, may be able to only move data in and out of the PCIe device. SR-IOV is also referred to as hardware virtualization since a hardware device—e.g., a PCIe device—is divided into multiple instances which can be assigned to various resources in the computing devices. Each SR-IOV VF may be assigned to a different OS or virtual machine executing in the client device. In addition the computing system may assign a DMA window and a corresponding translation table to the SR-IOV VFs. Thus, although FIGS. 4A-4B associate only one translation tables 135A with service provider 405A, if the service provider 405A is a SR-IOV PF, the system 400 may further divide the translation table 135A and assign the resulting tables to each SR-IOV VF managed by the SR-IOV PF. Further still, in another embodiment, each SR-IOV VF may be a service provider where the associated translated tables may be split and assigned to other service provides—e.g., another SR-IOV VF.

Service provider 405B may be a virtual machine, operating system, another I/O adapter and the like. For simplicity, assume that service provider 405B is an operating system that services one or more clients 410 (e.g., applications). Currently service provider 405B includes client 410A which is permitted to access translation table 135B for performing DMA read and writes. The ghosted lines indicate that the service provider 405B is loading a new client 410B. Although the clients 410 may access the same translation table 135B when requesting DMA operations, in one embodiment, the service provider 405B may have to provide data protection schemes to prevent one client 410 from accessing and corrupting the data associated with the other client 410. Instead, by splitting the translation table 135B into two different translation tables, this data protection may be provided by the hardware or firmware in the computing system (e.g., the IOMMU) rather than the service provider 405B.

FIG. 4B illustrates the system 450 after splitting the translation table 135B into translation tables 135C and 135D. To do so, the IOMMU stores a data structure in register 145C (which was previously null) that points to the translation table 135D. Moreover, the data structure in 145B may be updated to reflect that translation table 135C is smaller than translation table 135B in FIG. 4A. That is, both translation table 135B and 135C start at the same physical address but new translation table 135C include fewer entries. Arrow 460 illustrates that client 410A is permitted to access the data mapped by translation table 135C while arrow 465 illustrates that client 410B is permitted to access the data mapped by translation tables 135D. In one embodiment, the IOMMU serves as a gate keeper such that only the client 410 assigned to the translation table 135 is permitted to access the mapped data when, for example, requesting a DMA read or write.

In one embodiment, a translation table 135 may be split in manner desired. Using the example shown in FIGS. 4A and 4B, the size of translation table 135C may be 90 percent the size of translation table 135B while the other 10 percent is assigned to translation table 135D. The ratio at which a translation table 135 is split may be selectable based on, e.g., the expected number of DMA requests the clients 410 will make. Namely, one client 410 may use DMA operations to read or write data in main memory from external data repositories more frequently than the other client 410, and thus, may be assigned a greater portion of the split translation table. Alternatively, the computing system may split the translation tables 135 in a predetermined ratio (e.g., in half) regardless of the expected number of DMA operations a service provider or client will perform. For example, the addressing scheme used by the system 450 may stipulate that any acceptable size of the translation tables is based on a power of two which means splitting a translation table results in two equally sized translation tables.

In one embodiment, instead of splitting a translation table in order to assign two translation tables 135 to two clients 410, the hypervisor 115 may instruct the IOMMU to update the registers 145 to split translation table 135B in order to assign one of the new translation tables (e.g., translation table 135C or 135D) to a different service provider 405. For example, after the split, service provider 405B may still be assigned translation table 135C but translation table 135D may be reassigned to service provider 405A or a newly loaded service provider 405. This reassignment may be performed in response to the hypervisor 115 determining that one service provider 405 uses most or all of its DMA window while another service provider 405 does not. Thus, splitting the translation table assigned to the latter service provider 405 and assigning one of the two new DMA windows to the former service provider 405 may increase the overall performing of the computing system 450.

FIGS. 5A-5B illustrate modifying translation registers 145 and tables 135 when splitting a translation table, according to embodiments described herein. Specifically, FIGS. 5A-5B include a more detailed illustration of the registers 145 and tables 135 when performing the translation table split shown in FIGS. 4A-4B. In system 500, two translation registers 145A and 145B point to the two translation tables 135A and 135B, respectively. In turn, translation tables 135A and 135B include one or more translation entries 235 that point to respective mapped data pages 245 stored in memory 125. Even though the mapped data pages 245 for the translation tables 135 are not stored in contiguous memory, in one embodiment, the pages 245 in the same translation table 135 are still in the same DMA window. That is, each data page 245 that is mapped by an entry 245 in translation table 135A is within the DMA window associated with table 135A even though these data pages 245 may be scattered at various physical addresses within memory 125. Assuming there are no other translation tables 135 in system 500 than the ones shown, the memory 125 may be divided primarily into two DMA windows: one that is associated with translation table 135A and another associated with table 135B.

System 550 of FIG. 5B illustrates splitting translation table 135B into translation tables 135C and 135D. As shown here, the register 145A and the translation table 135A are unaffected by the split of translation table 135B. That is, after the split, the entries 245 in table 135A continue to point to the same mapped data pages 245 as they did before the split. To form the two new translations tables, the hypervisor may instruct the IOMMU to update the translation registers 145. In one embodiment, the IOMMU stores in unused register 145C a data structure defining one of the new translation tables 135. As discussed above, the registers 145C may store a pointer to the starting physical address of translation tables 135D in main memory 125 that is apportioned for storing the translation tables 135. The data in register 145C may also store the length or ending physical address of the translation table 135D. Similarly, the IOMMU may update the data in register 145B to reflect the length of table 135C which may start at the same physical address as translation table 135B but is now smaller in size—e.g., can store less entries 235.

In one embodiment, the IOMMU (or the OS) may clear out the entries in translation table 135D that is being assigned to the new client. This may prevent the new client from accessing data (e.g., mapped data pages 245) that store data associated with the old client (e.g., client 410A in FIG. 4B). Further still, before performing the split, the hypervisor may instruct the service provider (e.g., an operating system) that the entries in the lower portion of translation table 135B will be cleared. Although not shown in FIG. 5B, the service provider may move the entries 235 in the lower portion to the upper portion so that the entries 235 may continue to be used by the old client after the split occurs.

Merging Translation Tables

FIGS. 6A-6B illustrate modifying translation registers 145 and tables 135 when merging two translation tables 145, according to embodiments described herein. Specifically, FIGS. 6A-6B illustrate combining translation tables 135A and 135C (and their DMA windows) into a single translation table and DMA window. As shown by system 600, the translation registers 145A-C each point to a respective one of the translation tables 135A, 135C and 135D. Based on a request from a service provider or based on a performance metric, the hypervisor may transmit an instruction to the IOMMU to merge two of the translation tables 135. Referring to FIG. 4B, the service provider 405B may determine that the two clients 410A and 410B do not perform enough DMA operations to warrant assigning different DMA windows to each of the clients 410. Or, one of the clients 410 may have ceased executing in which case the service provider 405B no longer wants separate translation tables 135 and DMA windows. Regardless of the reason, the service provider 405B may inform the hypervisor that it no longer needs both translation tables 135C and 135D. The hypervisor may then to decide to merge one of the translation tables 135 assigned to service provider 405B with another translation table.

As shown in system 650 of FIG. 6B, the hypervisor may merge translation table 135C with translation table 135A to form translation table 135E. In one embodiment, the hypervisor may measure a performance metric associated with the various service providers. If one service provider is underutilizing its assigned DMA windows, one of its translations tables 135 may be merged with a translation table assigned to a service provider that more often utilize its DMA window(s). In one embodiment, the hypervisor may monitor the number of DMA operations initiated on behalf of each service provider and rearrange the translation tables 135 (e.g., merge or split the tables) based on the current or historical usage.

To merge the translation tables 135A and 135C, the hypervisor may instruct the IOMMU to clear the data stored in register 145B. In this manner, the IOMMU no longer has a translation register 145 that points to translation table 135C. The IOMMU may then combine this space with translation table 135A to form table 135E. To do so, the IOMMU may modify the data stored in register 145A to indicate that the size of the translation table 135E encompasses both table 135A and 135C. In this manner, system 650 now includes only two translation tables 135D and 135E with there corresponding DMA windows in memory 125.

System 650 also illustrates that the entries 235 in one of the merged tables may be cleared. Referring back to FIG. 5B, translation table 135C may be assigned to service provider 405B while translation table 135A is assigned to service provider 405A. If table 135C is being merged with table 135A and reassigned to service provider 405A, the translation entries 235 may be cleared before service provider 405A is permitted to use merged table 135E to perform a DMA operation. Doing so may prevent service provider 405A from corrupting or accessing data associated with service provider 405B. Stated differently, clearing the entries 235 removes the pointer to the mapped data page 245 thereby preventing the newly assigned service provider from using the physical address associated with the mapped data page 245. In one embodiment, the operating system associated with service provider 405B may decide to move the entries 235 from table 135C into table 135D in order to retain a pointer to the mapped data pages 245.

Furthermore, if both of the tables 135 being merged are reassigned to a different service provider after merging is complete, then the entries 235 in both tables 135A and 135C may be cleared. In this case, the merged translation table—e.g., translation table 135E—has no valid entries 235 after merging is complete. In another embodiment, however, the entries 235 in both tables 135 being merged may be unchanged during the merging process if the merged tables 135 are assigned to the same service provider after the merge as they were before the merge. In this case, the IOMMU may leave the entries 235 unchanged. One example of such a situation is if a service provider instructs the IOMMU to merge translation table 135 associated with two clients into a single table that remains assigned to the original service provider.

Figure 7B:
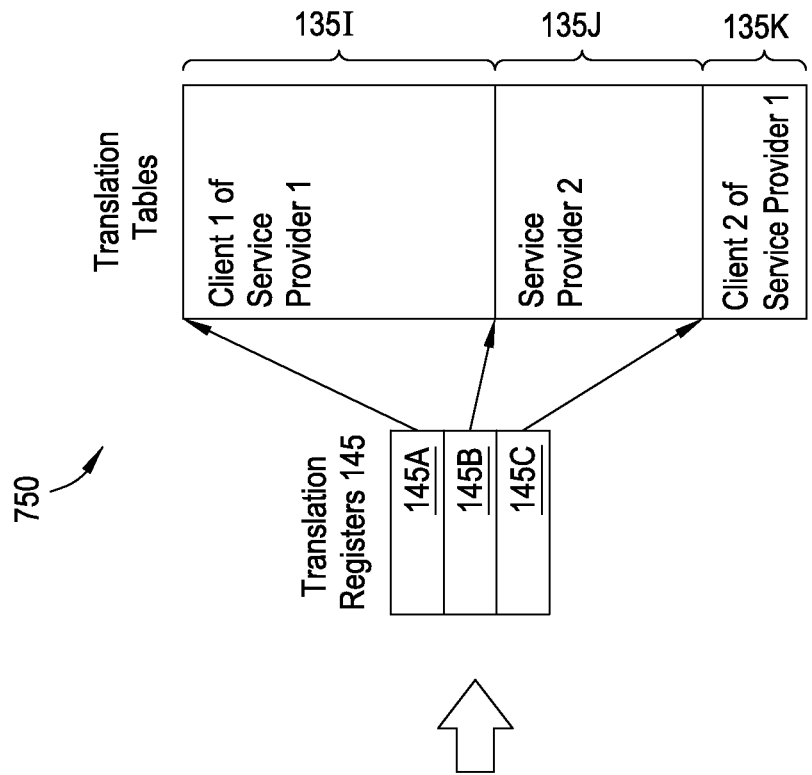
FIGS. 7A-7B illustrate modifying translation registers and tables when swapping space in the translation tables between service provider, according to embodiments described herein.
Figure 7A:
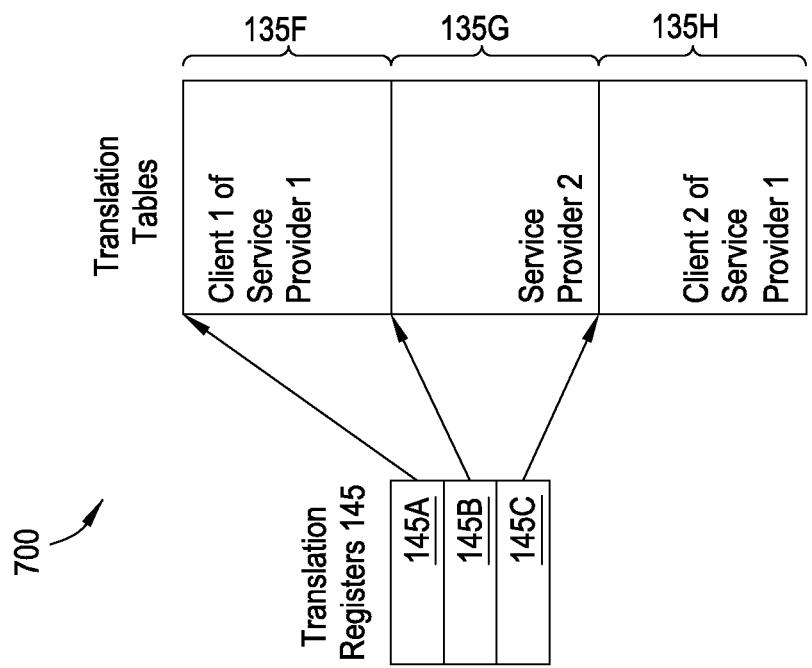

FIGS. 7A-7B illustrate modifying translation registers 145 and tables 135 when swapping space in the translation tables 135 between service provider, according to embodiments described herein. In system 700, the translation registers 145 each point to a respective translation table 135. As shown, translation table 135F is assigned to Client 1 of Service Provider 2, translation table 135G is assigned to Service Provider 2 and translation table 135H is assigned to Client 2 of Service Provider 1. For the example shown, assume that Service Provider 1 (or the hypervisor) has determined that the system 700 may benefit if some of the address space of translation table 135H is given to translation table 135F. Stated differently, Client 2 may be underutilizing its DMA window, and thus, a portion of that window may be given to Client 1 (or another service provider) in order to improve overall system performance.

In one embodiment, the system 700 may require that the address space of each translation table 135 be contiguous. If so, the translation tables 135 cannot be divided into different chucks and stored in the memory 125 at discontiguous memory locations. Thus, to increase the size of translation table 135F (and its DMA window), the hypervisor may be unable to directly assign a portion of translation table 135H to translation table 135F. To increase the size of translation table 135F and the DMA window assigned to Client 1, the hypervisor may have to add contiguous memory to the table 135F—i.e., take address space from translation table 135G assigned to Service Provider 2.

However, reducing the size of translation table 135G may decrease the performance of Service Provider 2. Accordingly, if the Service Provider 2 is not underutilizing its DMA window, then splitting translation table 135G into two tables and merging the split table that is contiguous with table 135F may ultimately decrease system performance. Other reasons the hypervisor may be unable give address space in translation table 135G to 135F is because of a minimum size requirement or the system administrator has fixed the size of table 135G. Regardless of the reason for not using translation tables 135G to provide a larger DMA window for Client 1, the hypervisor may increase the size of Client 1's DMA window by swapping address space between the translation tables 135.

As shown by system 750 of FIG. 7B, some of the address space in translation table 135H is given to translation table 135G (i.e., the portion of table 135H that is contiguous with table 135G) while a portion of translation table 135G is given to translation table 135F (i.e., the portion of table 135G that is contiguous with translation table 135F). To do so, translation tables 135G and 135H may be split. The upper portion of 135G may be merged with translation table 135F to form translation table 135I while the lower portion of table 135G and the upper portion of 135H are merged to form translation table 135J. The hypervisor may then assign translation table 135I to Client 1 of Service Provider 1, table 135J to Service Provider 2, and the lower portion of the split translation table 135H—i.e., table 135K—to Client 2 of Service Provider 1. By shifting the translation table assigned to Service Provider 2 down, the hypervisor enlarges the translation table assigned to Client 1, decreases the table assigned to Client 2, but maintains the size of the translation table assigned to Service Provider 2. Thus, even in an embodiment where the translation tables 135 are limited to contiguous addresses, the hypervisor may perform multiple splits and merges as described in FIGS. 4-6 to shift the address spaces of the translation tables 135 in order to swap memory space between the translation tables.

In one embodiment, the hypervisor has access to performance metrics associated with the DMA engines, IOMMU, DMA windows, the service provider/clients, or any other element in the computing system that participates in a DMA operation. For example, the hypervisor may determine a current or average utilization rate of the DMA engine which indicates the ratio the DMA engine is idle compared to when it is performing a DMA operation. Alternatively or additionally, the hypervisor may monitor the number of valid mapped data pages in a DMA window to determine a ratio between the maximum storage capacity of the DMA window and the number of mapped data pages currently being stored. Based on measuring a plurality of these ratios, the hypervisor may generate an average utilization rate associated with the DMA window. Similar utilization rates may be derived from monitoring, for example, the number of requests issued by a service provider or client, how many times the entries in the translation table are accessed by the IOMMU, and the like. Regardless how the utilization rate is measured, in one embodiment, the hypervisor may predict when to split or merge the translation tables in the computing system based on the utilization rate associated with the DMA elements.

In one embodiment, the hypervisor may identify patterns based on the utilization rate. For example, a utilization rate of a DMA element may increase (or decrease) at a predictable times in a day. This pattern may then be used to delete, add, reassign, or adjust the sizes of the translation tables before the need actually arises. Reconfiguring the system in anticipation of changing needs of the service provider may result in less downtime or increase performance relative to reconfiguring the system in response to when a change in utilization rate is actually detected.

For example, the computing system may use an I/O adapter for transferring employee data records from a data repository to the computing device. The hypervisor may identify a pattern where the utilization rate of the DMA window assigned to the I/O adapter spikes every Friday when the accountant department generates the payroll. However, during this time the utilization rate of the DMA window used by an I/O adapter responsible for backing up data may be low during this time (e.g., the computing system may back up its data files at night after business hours). As such, Friday morning, the hypervisor may split the translation table associated with the I/O adapter that performs back-up services and merge one of the split portions with the translation table associated with the I/O adapter used when generating the payroll. As the business day comes to a close, the hypervisor may do the reverse in order to increase the DMA window associated with the I/O adapter that backs up the computer system's data. In this manner, the computing system generates patterns that the hypervisor may use to perform predictive splits and/or merges.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
    determining to split a direct memory access (DMA) translation table assigned to a first service provider in a computing system into a first translation table and a second translation table, the first and second translation tables performing a virtual address to physical address translation for accessing data stored in respective DMA windows which define respective portions of memory in the computing system;
    updating a first register of a plurality of registers to include a pointer to the first translation table, wherein, before determining to split the DMA translation table, the first register stores a pointer to the starting memory address of the DMA translation table and a length indicator that defines the maximum number of translation entries in the DMA translation table, wherein the DMA translation table and the first translation table share the same starting memory address, and wherein updating the first register comprises changing the length indicator to a value that is less than the maximum number of translation entries in the DMA translation table;
    storing in a second register of the plurality of registers a pointer to the second translation table; and
    assigning the second translation table to one of a second service provider in the computing system and a client executed by the first service provider, wherein the second service provider or the client is configured to use the second translation table for performing a DMA operation between an I/O adapter and one of the DMA windows.

2. The method of claim 1, wherein the first and second translation tables each comprise a plurality of translation entries that map virtual address to physical addresses in the DMA windows for storing or retrieving data pages when performing the DMA operation.

3. The method of claim 1, wherein the first and second registers are used by the computing system to limit access to the DMA windows to only service providers assigned to the first and second translation tables.

4. The method of claim 3, wherein the first translation and second translation tables are assigned to different clients executing on the first service provider, wherein the different clients cannot access the DMA window assigned to another client in the first service provider.

5. A method comprising:
    determining to split a DMA translation table assigned to a first service provider in a computing system into a first translation table and a second translation table by (i) determining a utilization rate associated with a DMA element in the computing system used when performing a DMA operation, and (ii) comparing the utilization rate to one or more thresholds to determine to split the DMA translation table in the first and second translation tables, the first and second translation tables performing a virtual address to physical address translation for accessing data stored in respective DMA windows which define respective portions of memory in the computing system;
    updating a first register of a plurality of registers to include a pointer to the first translation table;
    storing in a second register of the plurality of registers a pointer to the second translation table; and
    assigning the second translation table to one of a second service provider in the computing system and a client executed by the first service provider, wherein the second service provider or the client accesses the second translation table for performing the DMA operation between an I/O adapter and one of the DMA windows.

6. The method of claim 5, further comprising:
    identifying a pattern associated with a plurality of historical utilization rates associated with the DMA element; and
    based on the identified pattern, determining to the split the DMA translation table in anticipation of a change in the utilization rate.

* * * * *